US008488435B2

(12) United States Patent
Snyder

(10) Patent No.: US 8,488,435 B2
(45) Date of Patent: Jul. 16, 2013

(54) TRANSDUCER BONDED TO A LASER MODULE FOR HEAT ASSISTED MAGNETIC RECORDING

(75) Inventor: Tanya Jegeris Snyder, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 147 days.

(21) Appl. No.: 13/167,054

(22) Filed: Jun. 23, 2011

(65) Prior Publication Data

US 2012/0327752 A1 Dec. 27, 2012

(51) Int. Cl.
*G11B 7/00* (2006.01)

(52) U.S. Cl.
USPC .................................................... 369/112.27

(58) Field of Classification Search
None
See application file for complete search history.

(56) References Cited

U.S. PATENT DOCUMENTS 6,687,277 B2 2/2004 Hatakoshi et al.
6,778,486 B1 8/2004 Arikawa et al.
6,963,530 B1 11/2005 Thornton et al.
7,042,810 B2 5/2006 Akiyama et al.
7,133,230 B2 11/2006 Saga et al.
7,171,080 B2 * 1/2007 Rausch .......................... 385/37
7,272,079 B2 9/2007 Challener
7,310,205 B2 12/2007 Hsu et al.
7,412,143 B2 8/2008 Rottmayer et al.
7,643,248 B2 1/2010 Sluzewski
8,139,448 B1 * 3/2012 Hirano et al. ............. 369/13.33
8,184,507 B1 * 5/2012 Hirano et al. ............. 369/13.33
8,279,719 B1 * 10/2012 Hu et al. ................... 369/13.01
2006/0098926 A1 * 5/2006 Shelnut et al. ............... 385/129
2007/0122548 A1 * 5/2007 Inaba et al. .................. 427/180
2008/0002298 A1 * 1/2008 Sluzewski ................. 360/234.4
2009/0073858 A1 3/2009 Seigler et al.
2009/0262608 A1 10/2009 Kurita et al.
2009/0266789 A1 10/2009 Shimazawa et al.
2010/0128579 A1 5/2010 Seigler et al.
2010/0328807 A1 12/2010 Snyder et al.
2011/0122737 A1 * 5/2011 Shimazawa et al. ....... 369/13.24

* cited by examiner

*Primary Examiner* — Paul Huber
(74) *Attorney, Agent, or Firm* — Hollingsworth Davis, LLC

(57) ABSTRACT

An apparatus includes a transducer assembly including a waveguide and a grating structured to couple electromagnetic radiation into the waveguide, and a laser module including a laser diode and a transparent cover adjacent to an output facet of the laser diode, wherein the laser module is bonded to the transducer assembly and the laser diode directs electromagnetic radiation through the transparent cover and onto the grating. A method of making the apparatus is also provided.

18 Claims, 5 Drawing Sheets

TRANSDUCER BONDED TO A LASER MODULE FOR HEAT ASSISTED MAGNETIC RECORDING

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM), or lens, fabricated on a planar waveguide; and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

High levels of optical radiation are delivered to the HAMR head in order to provide rapid heating of magnetic media. A HAMR light delivery system is needed that meets cost, reliability and performance constraints.

SUMMARY

In one aspect, the disclosure provides an apparatus including a transducer assembly including a waveguide and a grating structured to couple electromagnetic radiation into the waveguide, and a laser module including a laser diode and a transparent cover adjacent to an output facet of the laser diode, wherein the laser module is bonded to the transducer assembly and the laser diode directs electromagnetic radiation through the transparent cover and onto the grating.

These and other features and advantages which characterize the various embodiments of the present disclosure can be understood in view of the following detailed description and the accompanying drawings.

DETAILED DESCRIPTION

Figure 1:
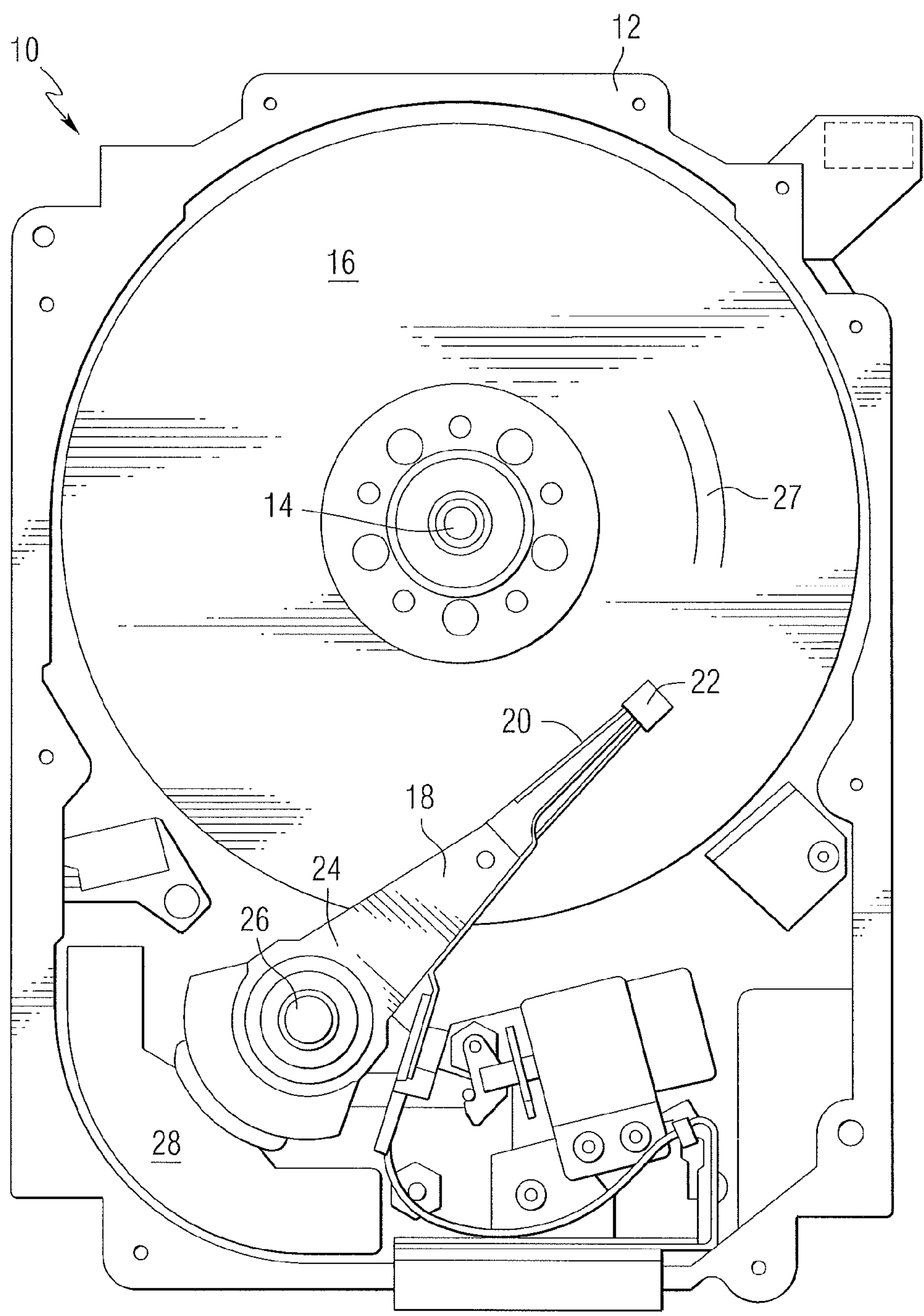
FIG. 1 is a pictorial representation of a data storage device in the form of a disc drive that can include a transducer assembly in accordance with an aspect of this disclosure.

FIG. 1 is a pictorial representation of a data storage device in the form of a disc drive 10 that can utilize a transducer assembly constructed in accordance with an aspect of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Heat assisted magnetic recording is also referred to a thermally assisted magnetic recording. As used in this description heat assisted magnetic recording encompasses apparatus and methods described by such alternative terminology.

Recent designs of HAMR recording heads include a thin film waveguide on a slider to guide light to the storage medium for localized heating of the storage medium. To launch light into the waveguide, a grating coupler can be used.

Figure 2:
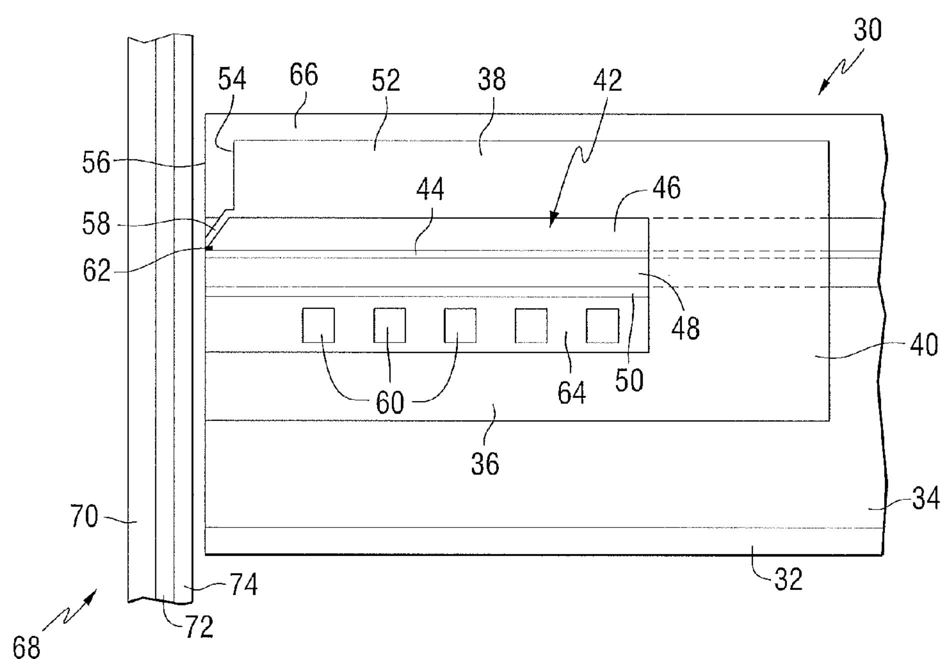
FIG. 2 is a cross-sectional view of a recording head.

FIG. 2 is a cross-sectional view of an example of a recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

A recording medium 68 is positioned adjacent to or under the recording head 30. The recording medium 68 in this example includes a substrate 70, which may be made of any suitable material such as ceramic glass or amorphous glass. A soft magnetic underlayer 72 is deposited on the substrate 70. The soft magnetic underlayer 72 may be made of any suitable material such as, for example, alloys or multilayers of Co, Fe, Ni, Pd, Pt or Ru. A hard magnetic recording layer 74 is deposited on the soft underlayer 72, with the perpendicular oriented magnetic domains contained in the hard recording layer 74. Suitable hard magnetic materials for the hard magnetic recording layer 74 may include at least one material selected from, for example, FePt or CoCrPt alloys having a relatively high anisotropy at ambient temperature.

The optical waveguide acts in association with a light source which transmits light to the waveguide. The light is coupled to the optical waveguide by a coupling means such as a grating. The light source may be, for example, a laser diode, or other suitable source of electromagnetic (EM) radiation. The light propagates through the optical waveguide toward the recording medium. EM radiation is transmitted from the waveguide for heating the recording medium, and particularly for heating a localized area of the recording layer. Although the recording head may be a perpendicular magnetic recording head and the storage medium may be a perpendicular magnetic recording medium, it will be appreciated that the disclosure may also be used in conjunction with other types of recording heads and/or recording mediums where it may be desirable to employ heat assisted recording.

Figure 3:
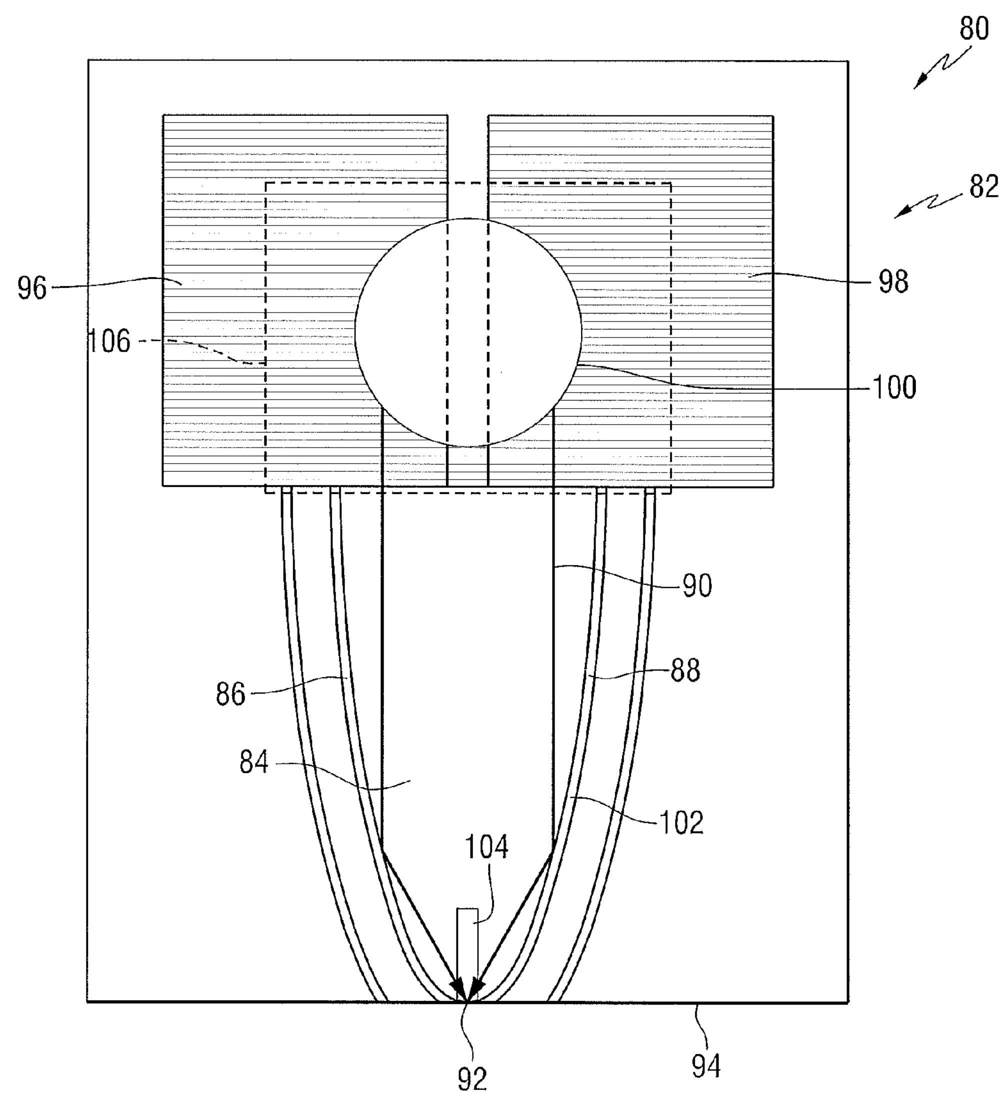
FIG. 3 is a cross-sectional view of a waveguide in a recording head.

FIG. 3 is a cross-sectional view of a waveguide 80 in a recording head 82. The waveguide includes a planar core layer 84 having generally parabolic edges 86 and 88, shaped to reflect light 90 to a focal point 92 at or near the air bearing surface 94. Gratings 96 and 98 are positioned on the core layer and used to couple light into the core layer. The gratings can be offset with respect to each other so that the electric component of the light in the two sides of the waveguide adds at the focal point. The light that impinges the gratings is shown as a spot 100. A reflective coating 102, which can be Au, is provided along the edges of the core layer. This arrangement forms a solid immersion mirror. A return pole 104 is positioned adjacent to the air bearing surface. A laser module can be positioned at the location shown by rectangle 106.

Figure 4:
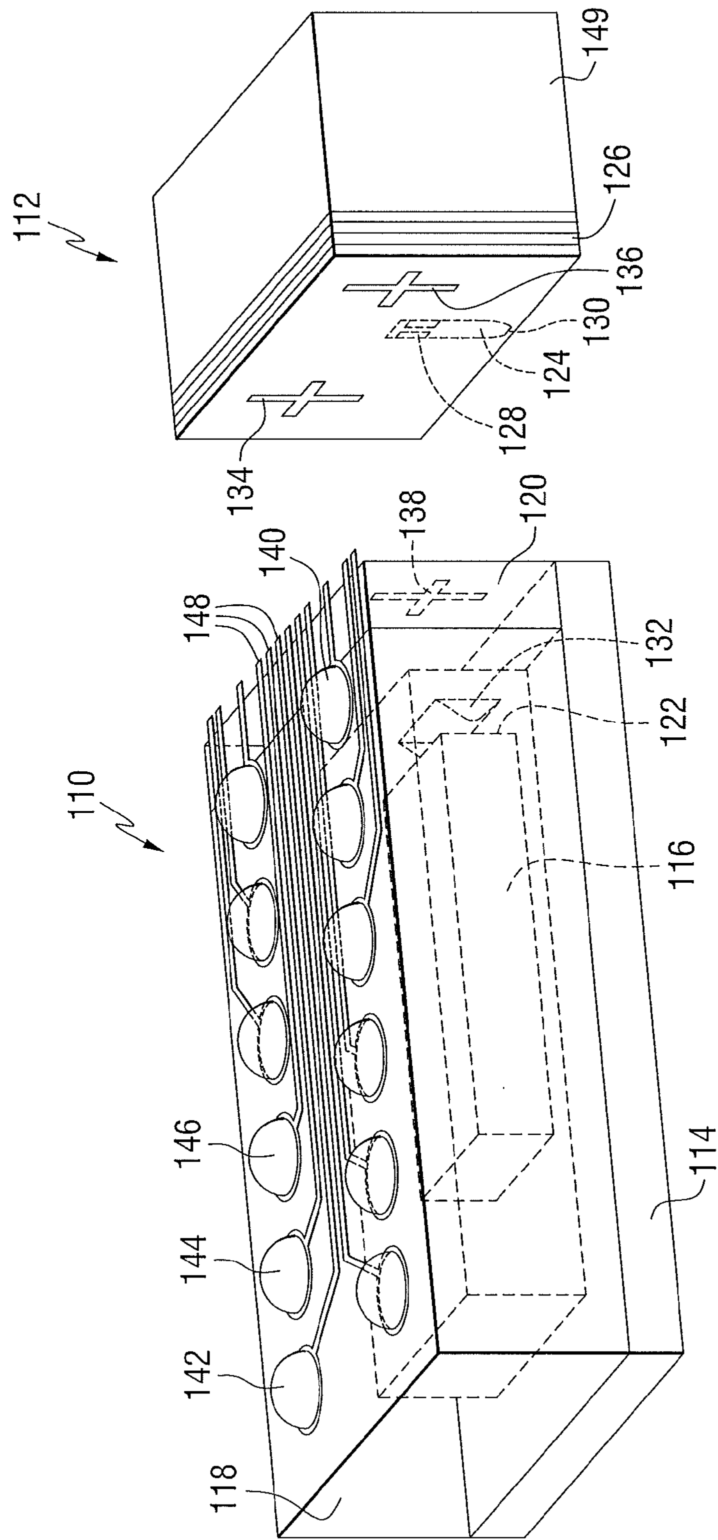
FIG. 4 is a perspective view of a laser module and a transducer portion of a recording head.

FIG. 4 is an isometric view of a laser module 110 and a transducer portion 112 of a recording head. The laser module includes a substrate 114, a laser diode 116 on the substrate, and an enclosure 118 around the laser diode. The laser can be, for example, a low cost gallium arsenide or indium phosphide semiconductor diode laser. Other material systems could be used as well for the diode laser; the material system will dictate the wavelength of emitted light.

The enclosure includes a transparent portion 120 adjacent to an output facet 122 of the laser diode. The transparent portion 120 forms a flat window face for the laser module. The enclosure can be made of, for example, borosilicate glass, quartz, or transparent polymers. The laser module can be hermetically sealed.

The transducer portion includes a waveguide 124 configured to receive light from the laser and a magnetic write pole in a layer 126 adjacent to the waveguide layer. A grating coupler 128 is included to couple light from the laser to the waveguide. The waveguide transmits the light to an air bearing surface 130 of the recording head. Light emitted from the air bearing surface is used to heat a portion of an adjacent recording medium, not shown in this view. The transducer portion can include other elements found in known recording heads, such as a coil for producing a magnetic field in the write pole, a read sensor, and associated components. A lens 132 is embedded in the enclosure 116. When the laser module 110 and transducer portion 112 are jointed together, light from the laser diode passes through the lens and is directed onto the grating coupler. A second lens could also be embedded in or positioned outside of the outside of enclosure 116 to provide additional beam shaping capabilities.

The transducer portion, also referred to as the head magnetics, can be fabricated on a first substrate and the laser module can be fabricated on a second substrate. To form the slider, the laser module is fixed to the transducer portion, for example, by gluing, soldering, fusion bonding, thermocompression bonding or other bonding methods that are commonly known. The bonding could be performed such that either the laser module 110 or the transducer portion 112, or both, could be in an array “bar” format to aid in parallel processing and handling.

On the transducer portion, a release layer can be used between the thin film layers and the substrate, or the substrate can be lapped away. Fiducial elements 134, 136, 138 and 140 can be provided to assist in the alignment of the laser module 110 and a transducer portion 112. A flip chip bonder or wafer bonder with a beam splitter and overlay vision alignment system would be used to line up the fiducials on the transducer portion with the fiducials on the laser module during the bonding process.

The laser module further includes a plurality of electrical contacts, 142, 144 and 146, that can be for example solder balls, which are electrically connected to a plurality of conductors, or connection leads 148. These conductors are then connected to various components of the recording head, including the laser and well known elements of the transducer portion. The connections from the laser module to the transducer portion could be formed by connecting leads 148 protruding from the laser module to electrical connection pads on the transducer portion 112. Additional solder material may be used to create the electrical connection between the connection leads 148 and the transducer element connections as part of the batch process (shadow mask or pre-deposition on transducer bar) or by individual solder deposition on each pad site.

The laser module serves as the slider body. The transducer is fabricated on a substrate, it is attached to the laser module, and then the substrate 149 of the transducer portion is removed. For example, after the laser module and the transducer portion have been aligned and bonded, the transducer portion substrate 149 can be released or lapped away.

The bottom portion of the assembly can then be removed to form the air bearing surface on the bottom of the laser module. In one example, the bottom portion can be lapped using electronic lapping guides to control the lapping. Electrical connections can be made using a top bond pad type of process.

The resulting assembly allows for an edge emitter to be used in a relatively small package, with a good thermal path from the laser to the air bearing surface. It would also allow for burn in and test of the laser diode prior to transducer attachment.

Figure 5:
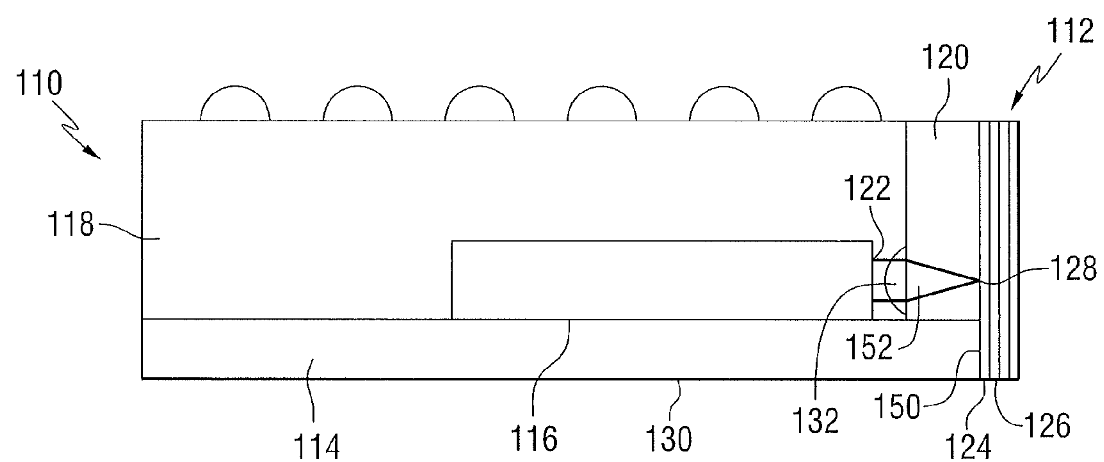
FIG. 5 is a cross-sectional view of a recording head constructed in accordance with an embodiment of the disclosure.

FIG. 5 is a longitudinal cross-sectional view of the slider of FIG. 4 after the transducer substrate has been released. In the slider of FIG. 5, the laser module 110 and the transducer portion 112 are connected together. In the example of FIG. 5, the laser module 110 is shown to be directly adjacent to a face 150 of the transducer portion 112. However, in other embodiments, a small gap can be formed between the laser module 110 and the transducer portion 112. To form the recording head of FIG. 5, the laser module 110 and the transducer portion 112 are joined together and lapped to form the air bearing surface 130.

The laser module includes a substrate 114 and a laser diode 116 in an enclosure 118. The enclosure includes a transparent portion 120 adjacent to an output facet 122 of the laser. Electrical current flows through the laser 116, which is a diode in this embodiment, and generates electron/hole recombination in an active region, which releases energy as photons. The generated light 152 passes through a lens 132 and is focused on a grating coupler 128 to couple light into a waveguide 124.

In one aspect of the disclosure, a laser module is mounted on the transducer assembly and the light beam is directly coupled into the waveguide without the need for external optical configurations. Once the light beam is coupled into the waveguide, the light propagates through the waveguide toward a truncated end of the waveguide that is formed adjacent the air bearing surface (ABS) of the recording head. Light exits the end of the waveguide and heats a portion of the media, as the media moves relative to the recording head. A near-field transducer can be positioned in or adjacent to the waveguide to further concentrate the light in the vicinity of the air bearing surface.

As illustrated in the drawings, the recording head includes a structure for heating the magnetic recording media proximate to where the write pole applies the magnetic write field to the recording media. In another aspect, the disclosure encompasses a data storage device that includes the transducer assembly described above. The laser module may be disposed on a trailing side of a slider substrate. A magnetic head, including a writer and a reader, is also disposed on the trailing side to form the slider head. By including the laser in the slider, the system eliminates the need for fiber optic cables, external mirrors or other optical connections that could degrade the dynamic mechanical performance of the head.

In another aspect, the disclosure provides an apparatus including a storage medium, a recording head, and an arm for positioning the recording head adjacent to the storage medium, wherein the recording head includes a transducer assembly including a waveguide and a grating structured to couple electromagnetic radiation into the waveguide; and a laser module including a laser diode and a transparent cover adjacent to an output facet of the laser diode, wherein the laser module is bonded to the transducer assembly and the laser diode directs electromagnetic radiation through the transparent cover and onto the grating.

In another aspect, the disclosure encompasses a method, including: providing a transducer assembly including a waveguide, and a grating structured to couple electromagnetic radiation into the waveguide, providing a laser module including a laser diode and a transparent cover adjacent to an output facet of the laser diode, and bonding the laser module to the transducer assembly, wherein the laser diode directs electromagnetic radiation through the transparent cover and onto the grating. The laser module can include one or more lenses mounted between an output facet of the laser diode and a grating structure on the transducer assembly. The bonding step can include aligning fiducials on both the transducer assembly and the laser module. A flip chip bonder or wafer bonder with a beam splitter and overlay vision alignment system can be used to align the fiducials The bonding can be implemented using gluing, soldering, fusion bonding, or thermocompressive bonding. The laser module can be hermetically sealed. In addition, the laser module can be constructed of borosilicate glass, quartz, or transparent polymer. The transducer assembly can include a substrate and a release layer between the substrate and the waveguide. In the fabrication process, the substrate can be released from the waveguide. The transducer assembly and the laser module can be lapped to form an air bearing surface.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus, comprising:

a transducer assembly including a waveguide and a transducer assembly surface normal to an air bearing surface, wherein a first alignment fiducial and a grating structured to couple electromagnetic radiation into the waveguide are disposed on the transducer assembly surface; and a laser module including a laser diode and a transparent cover adjacent to an output facet of the laser diode, the transparent cover including a laser module surface that faces the transducer assembly surface, wherein a second alignment fiducial is disposed on the laser module surface, wherein the laser module surface is bonded to the transducer assembly surface so that the first and second alignment fiducials are aligned and the laser diode directs electromagnetic radiation through the transparent cover and onto the grating.

2. The apparatus of claim 1, wherein the laser module further comprises:

one or more lenses mounted between an output facet of the laser diode and a grating structure on the transducer assembly.

3. The apparatus of claim 1, wherein the transducer assembly and the laser module are bonded together using one of:

gluing, soldering, fusion bonding, or thermocompressive bonding.

4. The apparatus of claim 1, wherein the laser module is hermetically sealed.

5. The apparatus of claim 1, wherein the laser module further comprises one of:

borosilicate glass, quartz, or transparent polymer.

6. The apparatus of claim 1, wherein the alignment fiducials are arranged to facilitate aligning the transducer portion with the laser module using a flip chip bonder or wafer bonder with a beam splitter and overlay vision alignment system.

7. An apparatus, comprising:

a storage medium;

a recording head; and an arm for positioning the recording head adjacent to the storage medium;

wherein the recording head includes:

a transducer assembly including a waveguide and a transducer assembly surface normal to an air bearing surface, wherein a first alignment fiducial and a grating structured to couple electromagnetic radiation into the waveguide are disposed on the transducer assembly surface; and a laser module including a laser diode and a transparent cover adjacent to an output facet of the laser diode, the transparent cover including a laser module that faces the transducer assembly surface, wherein a second alignment fiducial is disposed on the laser module surface, wherein the laser module surface is bonded to the transducer assembly surface so that the first and second alignment fiducials are aligned and the laser diode directs electromagnetic radiation through the transparent cover and onto the grating.

8. The apparatus of claim 7, wherein the laser module further comprises:

one or more lenses mounted between an output facet of the laser diode and a grating structure on the transducer assembly.

9. The apparatus of claim 7, wherein the transducer assembly and the laser module are bonded together using one of:

gluing, soldering, fusion bonding or thermocompressive bonding.

10. The apparatus of claim 7, wherein the alignment fiducials are arranged to facilitate aligning the transducer portion with the laser module using a flip chip bonder or wafer bonder with a beam splitter and overlay vision alignment system.

11. A method, comprising:

providing a transducer assembly including a waveguide, and a grating structured to couple electromagnetic radiation into the waveguide;

providing a laser module including a laser diode and a transparent cover adjacent to an output facet of the laser diode;

aligning fiducials on both the transducer assembly and the laser module using a flip chip bonder or wafer bonder with a beam splitter and overlay vision alignment system; and bonding the laser module to the transducer assembly, wherein the laser diode directs electromagnetic radiation through the transparent cover and onto the grating.

12. The method of claim 11, wherein the laser module comprises:

one or more lenses mounted between an output facet of the laser diode and a grating structure on the transducer assembly.

13. The method of claim 11, wherein the bonding step comprises one of:

gluing, soldering, fusion bonding, or thermocompressive bonding.

14. The method of claim 11, wherein the laser module is hermetically sealed.

15. The method of claim 11, wherein the laser module further comprises one of:

borosilicate glass, quartz, or transparent polymer.

16. The method of claim 11, wherein the transducer assembly comprises:

a substrate; and a release layer between the substrate and the waveguide.

17. The method of claim 16, further comprising:

releasing the substrate from the waveguide.

18. The method of claim 11, further comprising:

lapping the transducer assembly and the laser module to form an air bearing surface.

* * * * *